United States
Hergenrother et al.

[11] 3,969,648
[45] July 13, 1976

[54] PROJECTION TELEVISION TUBE SYSTEM

[75] Inventors: George R. Hergenrother, Watertown; Henry E. Kloss, Cambridge, both of Mass.

[73] Assignee: Advent Corporation, Cambridge, Mass.

[22] Filed: Sept. 3, 1974

[21] Appl. No.: 502,768

[52] U.S. Cl. .............................. 313/482; 178/7.88
[51] Int. Cl.² ..................... H01J 31/00; H01J 29/89
[58] Field of Search ........... 313/476, 477, 474, 482, 313/478, 464, 461, 364; 358/60; 178/7.88, 7.89

[56] References Cited
UNITED STATES PATENTS

| | | | |
|---|---|---|---|
| 2,453,003 | 11/1948 | Edwards | 313/478 X |
| 2,663,012 | 12/1953 | Beers | 178/7.88 |
| 2,960,615 | 11/1960 | Harries | 178/7.88 X |
| 3,549,932 | 12/1970 | Lindeman | 313/407 |
| 3,803,436 | 4/1974 | Morrell | 313/406 X |
| 3,821,583 | 6/1974 | Steiner | 313/407 |

*Primary Examiner*—Robert Segal
*Attorney, Agent, or Firm*—Kenway & Jenney

[57] ABSTRACT

A color projection television receiver and projector having three color tubes mounted in fixed relation and in predetermined location relative to a screen for projecting three color pictures in registration thereon. Accurate registration of the pictures results from a projection tube structure adapted for accurate reproducability in production, whereby field adjustment is minimized. The tube structure employs a mounting barrel accurately suspended within the evacuated envelope and supporting a phosphorcoated target and a projection mirror. A Schmidt correction lens is mounted externally to the envelope of each tube.

8 Claims, 23 Drawing Figures

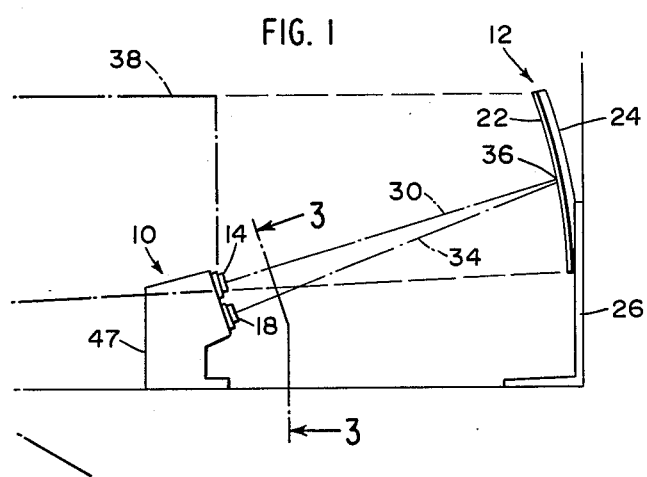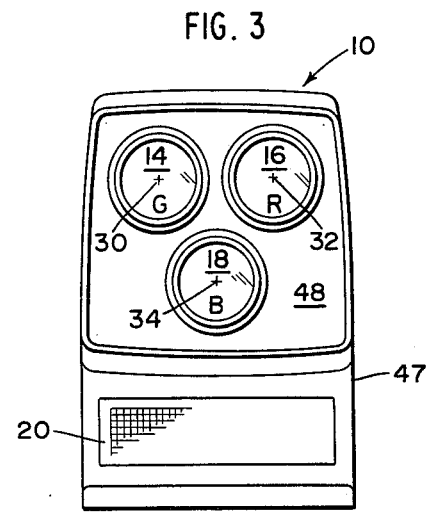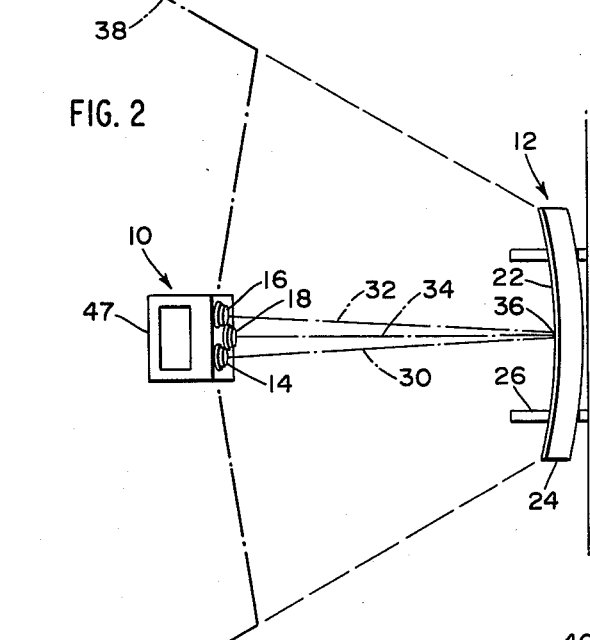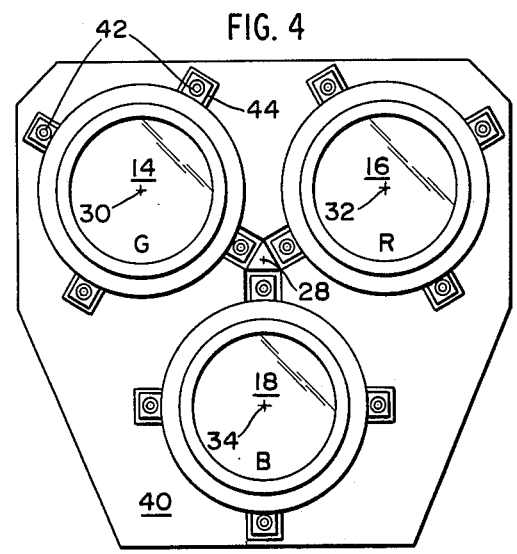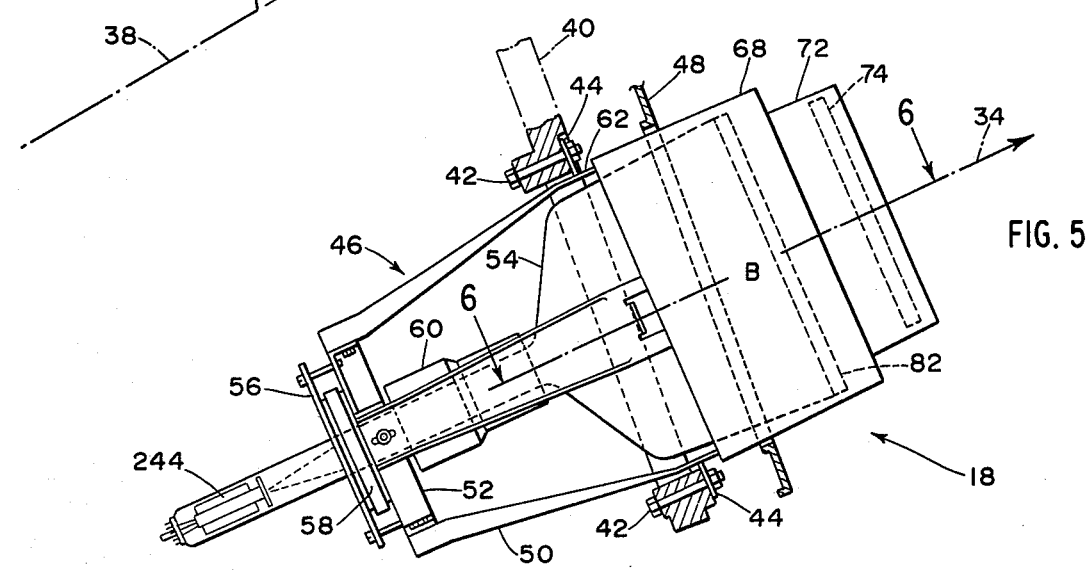

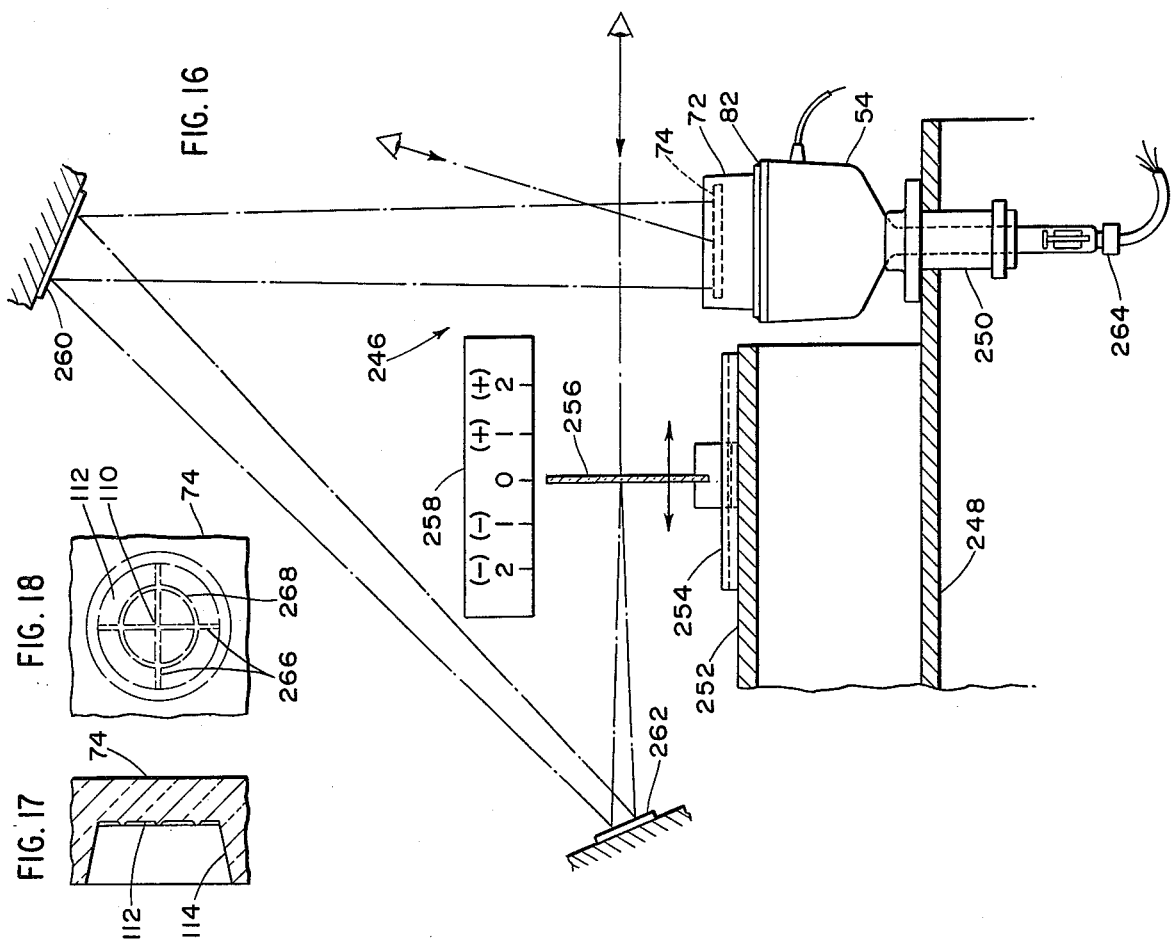
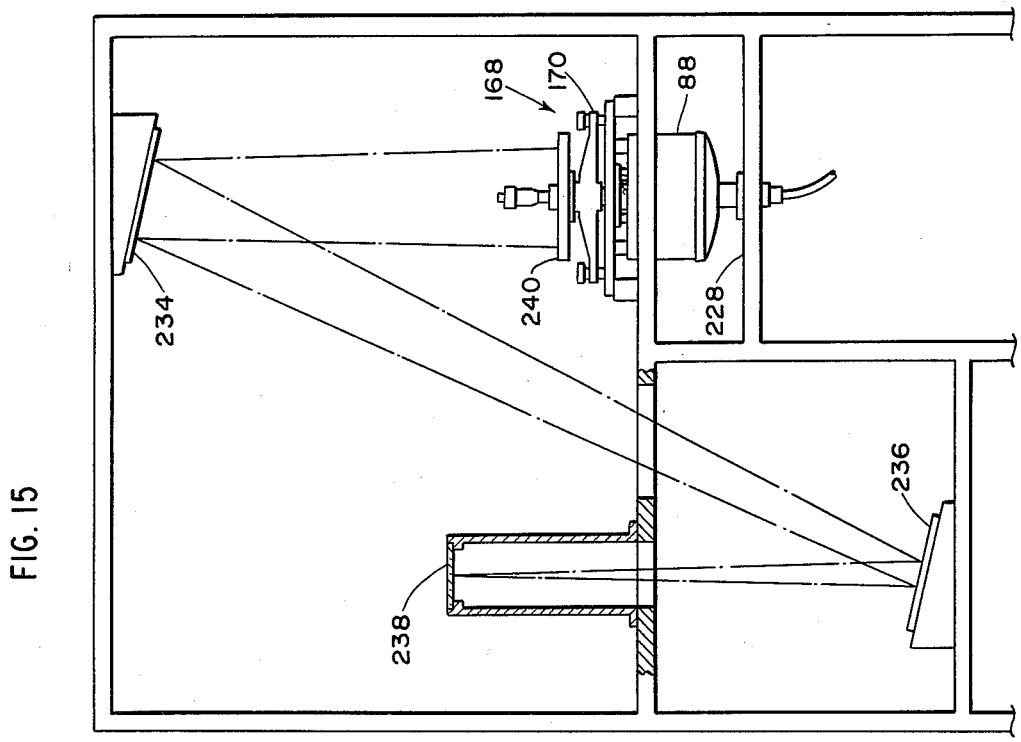

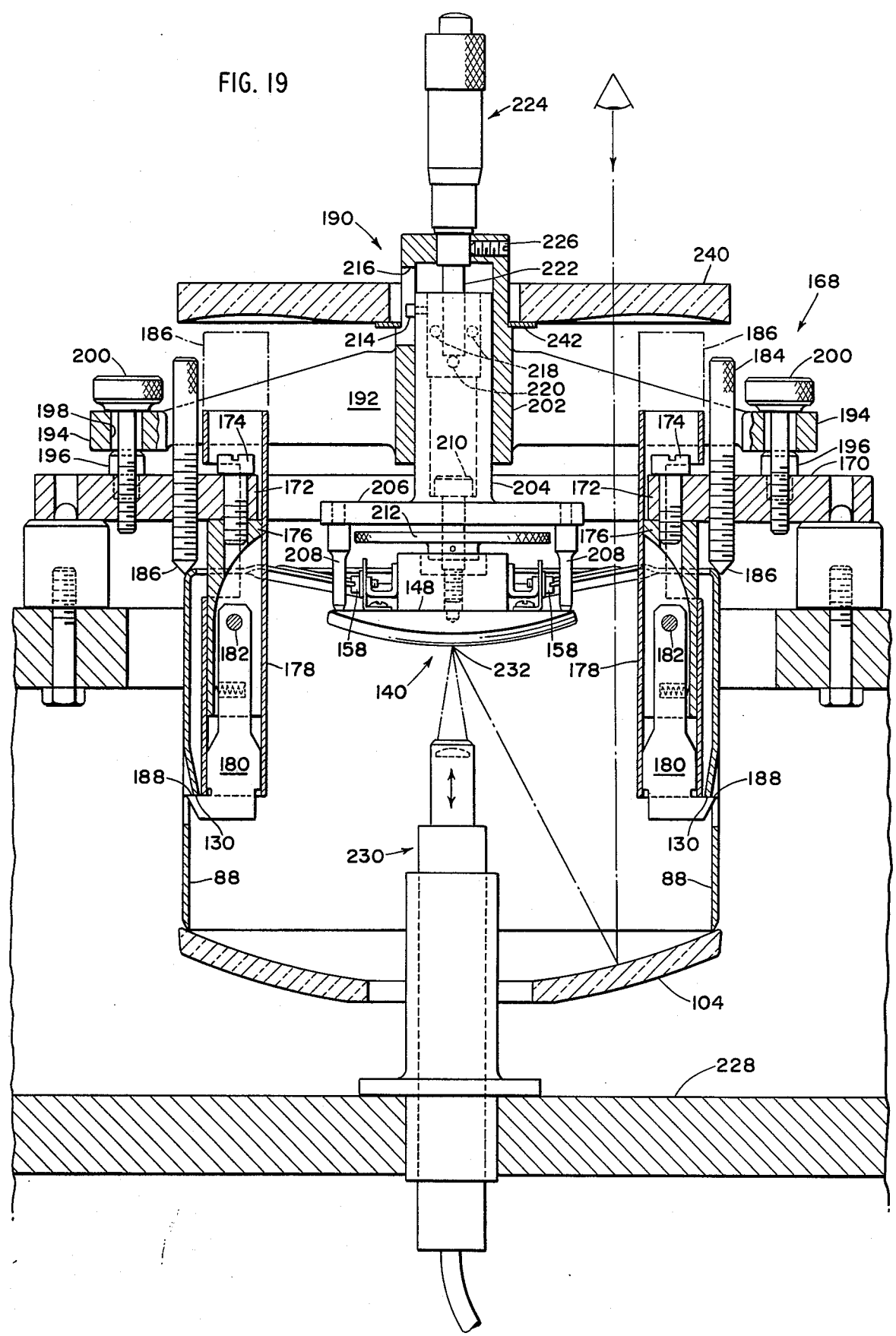

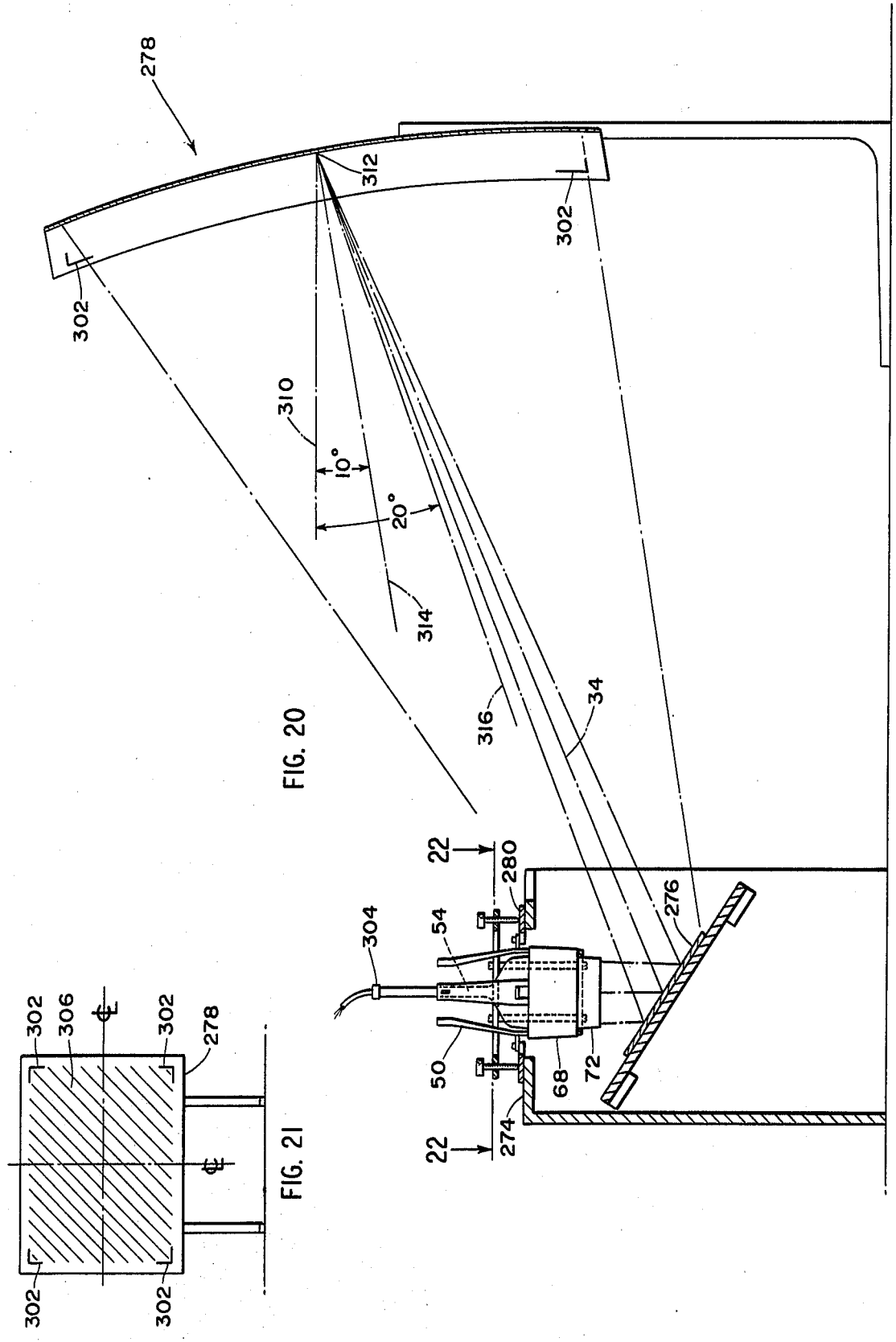

PROJECTION TELEVISION TUBE SYSTEM

BACKGROUND OF THE INVENTION

Techniques of projection television have been employed for a number of years, but hitherto the only products reaching the market on a sustained basis and in significant numbers have been expensive, large-screen units used for closed-circuit theatre presentations of sports or other special events, for background effects on news and other television broadcasts, and the like. Such units are complex, large in size, and difficult to maintain; consequently, they are not feasible for use in home entertainment, or even in places like clubs, lounges, lobbies, waiting rooms and the like, where one to a few dozen people may view them at a time.

It has previously been proposed to provide a color projection television system with a plurality of tubes each having a different color, the tubes projecting pictures superimposed in registry on a common viewing screen, as in U.S. Pat. Nos. 3,004,099 dated Oct. 10, 1961, and 2,960,615 dated Nov. 15, 1960.

Television receivers have been previously produced with the optics of a Schmidt-type projector, comprising a target illuminated in a single color by a corresponding electron beam raster, a spherical reflector, reflecting the light around the periphery of the target, and a correction lens through which the light passes to the viewing screen.

In color projection systems, substantial difficulties have attended efforts to use the Schmidt optics with each of a plurality of separate tubes in a system that can be produced for a large market, with accurate reproducibility of the tubes and correspondingly minimal adjustments by the serviceman or user in the field, whether for correction of image registration or for replacement of a tube.

The present invention has effectively overcome these difficulties by employing projection tube structures and methods adapted to achieve a high level of reproducibility of optical characteristics in production. Also, the receiver-projector is installed in a predetermined, fixed spatial relation to the screen. The combination of these characteristics assures the attainment of high-quality reception at a relatively modest cost, as compared with large-screen systems.

The features of construction and methods of production will be understood from the following description and the appended claims.

BRIEF DESCRIPTION OF THE DRAWING

FIG. 1 is a side elevation of the receiver-projector and screen.

FIG. 2 is a plan view corresponding to FIG. 1.

FIG. 3 is an enlarged front elevation of the projector taken on line 3—3 in FIG. 1.

FIG. 4 is an elevation of the projection tube cluster mounted upon the support panel, with the cabinet removed.

FIG. 5 is a longitudinal elevation of the "blue" projection tube mounted upon the support panel.

FIG. 15 is an elevation of the "first" optical bench, for positional adjustment of the target in relation to the mirror during assembly of a projection tube.

FIG. 16 is a view of the "second" optical bench, for selection and positional adjustment of a Schmidt correction lens, pre-mounted in an inner shroud, in relation to the face plate of an assembled projection tube.

FIGS. 17 and 18 are detail views showing registration marks on the correction lens.

FIG. 19 is an elevation in section of portions of the first optical bench, showing a mounting barrel and details of the fixture used for positional adjustment of the target in relation to the mirror.

FIG. 20 is an elevation of the "third" optical bench, for positional adjustment and mounting of the projection tube to its support harness and an outer shroud.

FIG. 21 is a front elevation, to a smaller scale, of the imaging screen shown in FIG. 20.

DETAILED DESCRIPTION

Figure 6:
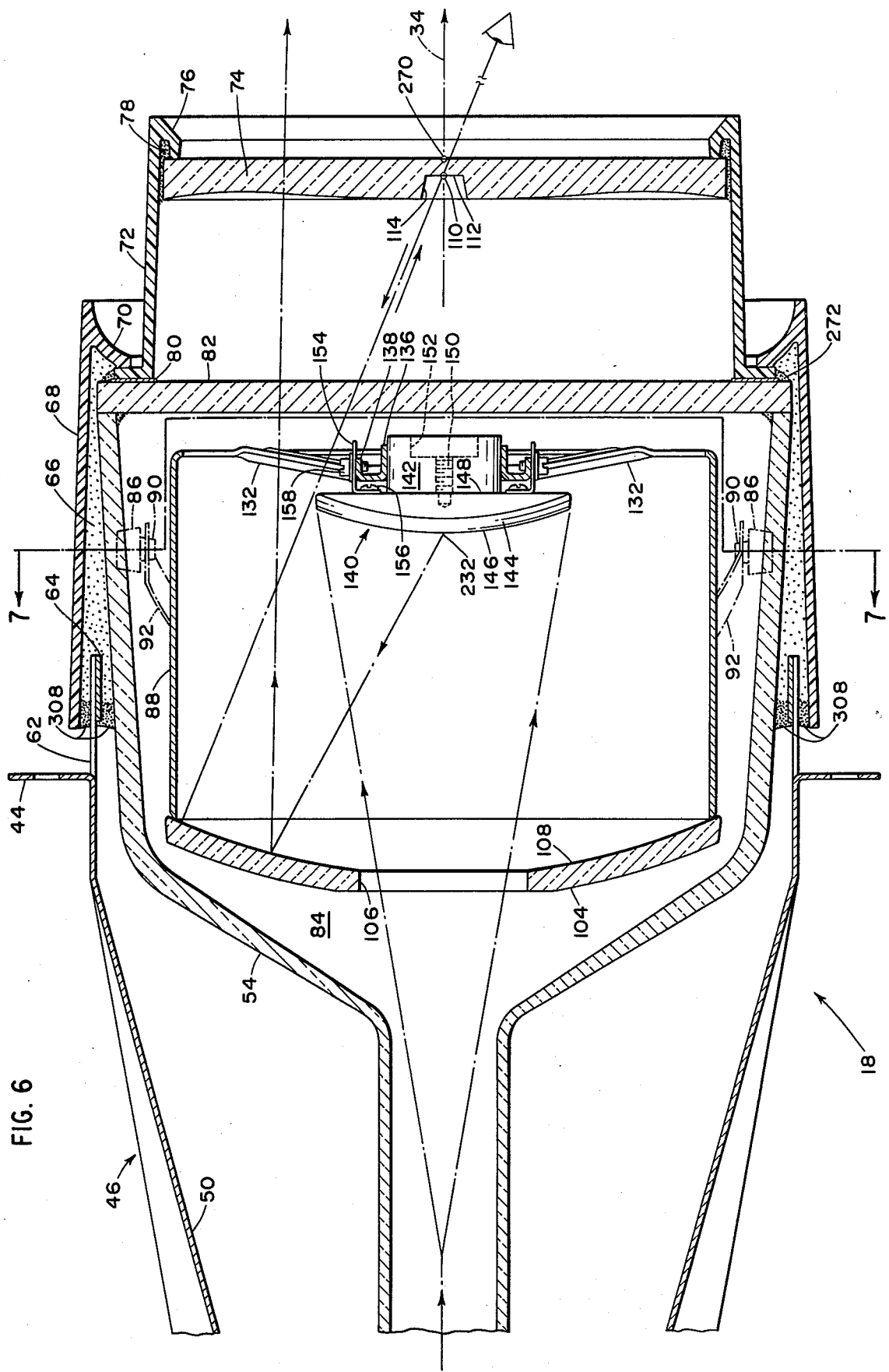
FIG. 6 is an enlarged fragmentary longitudinal elevation in section taken on line 6—6 in FIG. 5, showing details of the construction of the projection tube.

FIGS. 1, 2 and 3 illustrate the general arrangement of the receiver-projector unit 10 and the free-standing viewing screen 12 of a color projection television system embodying this invention. The unit 10, hereinafter called the receiver-projector, has three projection tubes, namely, a "green" tube 14, a "red" tube 16 and a "blue" tube 18. A loudspeaker (not shown) is mounted behind a grille 20 in the face of the receiver-projector. The electronic components within the receiver-projector are not shown and may be described generally as comprising components of well-known construction adapted for receiving standard color television signals by antenna, cable or video recording, and including circuits for driving the three color tubes 14, 16 and 18. Light images are projected from the tubes and are focused in registry and with proper interlace of scanning lines upon the spherical concave surface, of substantially rectangular outline, of a highly reflective aluminum screen material 22 covering a molded plastic screen frame 24. In a current commercial embodiment the picture on the screen is 1.33 meters high by 1.76 meters wide, and 2.34 square meters in area. The screen is 8 feet (2.44 meters) from the receiver-projector. The frame 24 is mounted upon two angle legs 26. The screen material 22 preferably comprises an aluminum reflective element formed by the process described in U.S. Pat. No. 3,408,132 to J. S. Chandler et al., dated Oct. 29, 1968. The picture brightness exceeds 20 foot-lamberts, which is sufficient for viewing with appreciable ambient illumination.

The screen bears an accurate spacial relationship to the projector 10. Referring to FIG. 4, 28 represents the axis of symmetry or "optical center line" of the optical axes 30, 32 and 34 of the three tubes. These latter axes are more specifically defined below. The axis 28 intersects the center 36 of the screen surface, such center being located at the intersection of its diagonals. The axis 28 is preferably "off-axis," that is, it forms an acute angle with the radius of the screen surface passing through its center, so that the receiver-projector is lowered in the field of view of the audience. Conventional keystone and bow correction circuits are employed in the electronics, and adapted to take into account the curvature of the screen.

The area bounded by broken lines 38 in FIGS. 1 and 2 defines the space within which an audience may view the screen 12.

We next turn to a detailed description of the blue tube 18, the tubes 14 and 16 being constructed in the same manner except as noted below. Referring to FIGS. 4 and 5, a projection tube mounting plate 40 of a rigid molded composition is secured to a fixed steel framework (not shown) within the receiver-projector 10. The plate 40 has three holes within which the three tubes are mounted. Each tube is mounted by four bolts 42 passing through holes in the plate 40. The bolts 42 pass through lugs 44 extending from a metal harness 46 within which the tube is accurately mounted. By the methods hereinafter described, the optical axis 34 of the tube is precisely located in relation to the plane in which the lugs 44 are located. Similarly, the surfaces of the plate 40 upon which the lugs rest are precisely located when formed, so that the images of the three tubes will intersect in precise registration on the surface of the screen 12 at proper optical focus. To this end, the holes through which the bolts 42 pass are formed in portions of the plate 40 having bosses and depressions therein of varying height and depth, as shown for example in FIG. 5.

A molded plastic cabinet or shell 47 surrounds the framework and components of the receiver-projector 10. The face of the latter is enclosed by a front cover panel 48 having clearance holes for the projector tubes (FIG. 5).

FIGS. 5 and 6 show details of the harness 46. The lugs 44 are bent up from end portions of four tapered channel-section legs 50 extending rearwardly to a square metal plate 52 having a central clearance hole through which the neck of the glass envelope 54 passes. A plate 56 fastened in spaced parallel relation to the plate 52 mounts a focusing magnet 58. A deflection yoke assembly 60 is received over the neck of the envelope 54. It should be noted that because the neck of the envelope 54 passes with clearance through the plate 52, the envelope 54 is restrained and supported by the harness only by means of portions of the legs 50 projecting forward of the lugs 44, as hereinafter described. These portions are shown at 62 in FIGS. 5 and 6, and are welded to a circular metal ring 64. The portions 62 and the ring 64 are potted within a body of plastic 66 which fills the space between the envelope 54 and a cylindrical plastic outer shroud 68, securing these elements in accurate spacial relationship as hereinafter more fully described in connection with the third optical bench shown in FIG. 20.

The outer shroud 68 has an inwardly projecting annular ring portion 70 having a surface resting upon an outwardly projecting annular flange on a generally cylindrical inner shroud 72, the latter mounting a circular clear plastic Schmidt correction lens 74. The lens 74 rests upon an annular surface of an inwardly projecting ring 76 on the shroud 72, and is secured thereto by an adhesive 78. The outwardly projecting flange on the shroud 72 rests upon one or more shims 80, accurately locating it in relation to the outer face of a clear flat glass face plate 82 sealed to the envelope 54 and forming therewith a gas-tight, evacuated space 84.

Figure 7:
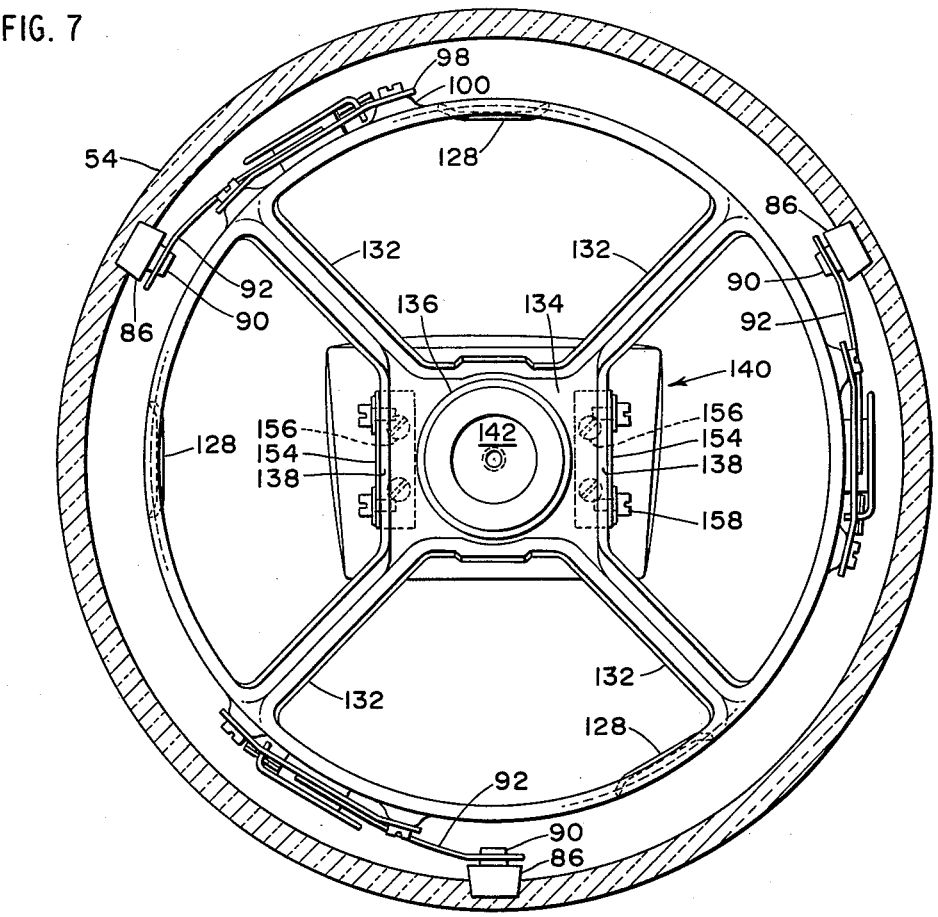
FIG. 7 is a transverse elevation in section taken on line 7—7 of FIG. 6.
Figure 8:
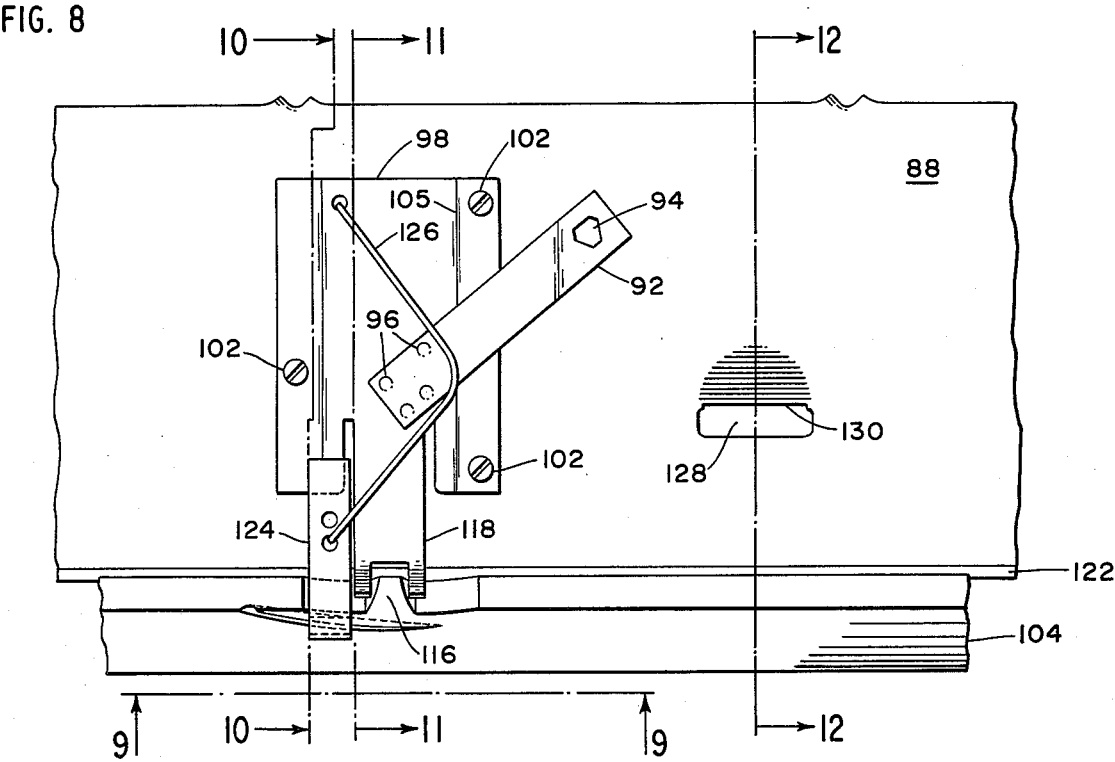
FIG. 8 is a partial developed view of the outer surface of the mounting barrel for the phosphor target and projection mirror, showing the means for attachment of the mirror to the barrel and the barrel to the glass envelope of the projection tube.
Figure 9:
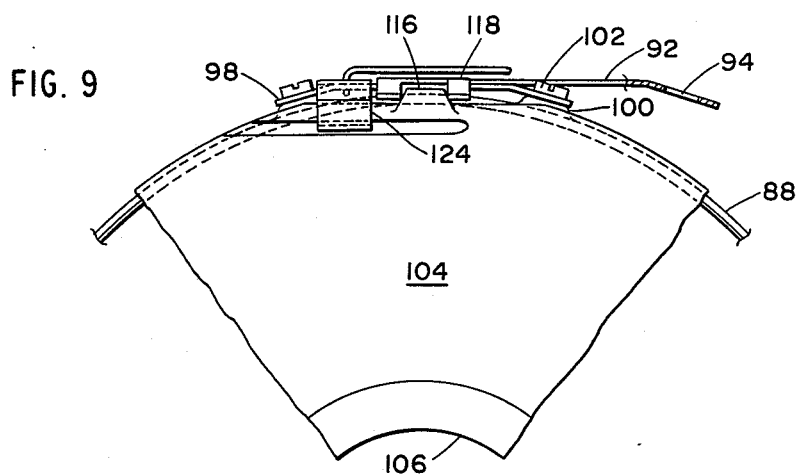
FIG. 9 is a fragmentary detail view taken on line 9—9 of FIG. 8.

The construction of the components mounted within the space 84 is illustrated in FIGS. 6 through 14. Three tapered cylindrical metal plugs 86 (FIGS. 6 and 7) are fused into the inner wall of the glass envelope 54 when it is molded. These plugs comprise the sole means for locating and mounting a generally cup-shaped cylindrical mounting barrel 88 of steel. (The plugs 86 appear to be diammetrically opposed in FIG. 6 because of the choice of section lines above and below the optical axis 34, but are actually 120 degrees apart as shown in FIG. 7.) The plugs have inwardly projecting, conically tapered portions of reduced diameter shown at 90. Three metal cantilever leaf springs 92 are each fastened at one end to the barrel 88 by means shown in FIGS. 8 and 9, and formed at the other end with triangular shaped holes 94 (FIG. 8) that fit with accuracy over the portions 90 of the plugs 86. The holes 94 are partially defined by three sides subtending angles of 60 degrees therebetween, whereby the springs 92 each have three-point contact with the surfaces of the portions 90 of the plugs. By this means a precise location is defined between the end of each spring and its corresponding plug 86. As shown in FIG. 8, each spring is welded by spot welds 96 to a generally rectangular plate 98. The barrel 88 is formed with a number of outwardly projecting bosses 100 (FIG. 9) upon which the plate 98 rests, and to which the plate is secured by screws 102 passing through holes in the barrel 88, with nuts (not shown). Preferably, the plates 98 are bent along lines 105 (FIG. 8) to permit parallel contact with the bosses.

Figure 10:
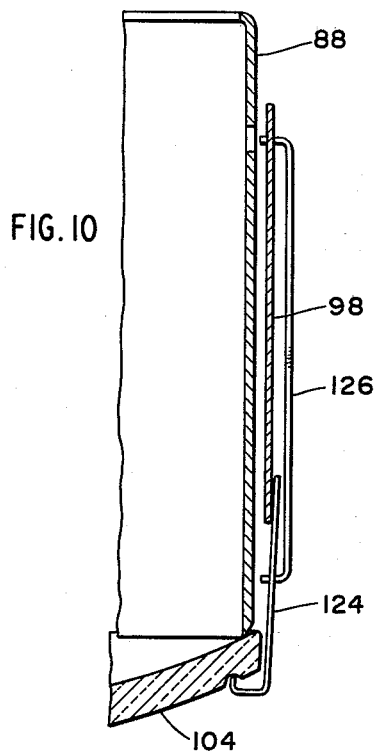
FIGS. 10, 11 and 12 are longitudinal sectional elevations showing parts of the mounting barrel, taken on lines 10—10, 11—11 and 12—12 of FIG. 8, respectively.
Figure 11:
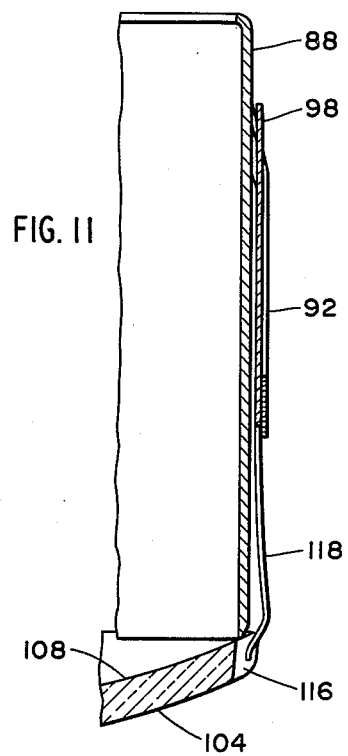

A glass mirror 104 is formed of circular peripheral outline with a central hole 106 for passage of the electron beam. A film of aluminum is evaporated onto the front surface 108 of the mirror, this surface being of spherical contour with the center of the sphere being located, by an assembly procedure described below, at a point 110 located on a surface 112 in a recess 114 formed in the correction lens 74 (FIG. 18). The mirror 104 is formed with three trapezoidal-shaped, radially extending lugs 116 (FIG. 8 and 11). These lugs receive resilient, bifurcated portions of extensions 118 integral with the plates 98. The lugs 116 and portions 118 serve to locate the mirror laterally of the axis 34, while permittting the spherical surface 108 to rest against a circular edge 120 defined by a conical chamfer 122 ground on the end of the barrel 88. The mirror is held resiliently against the edge 120 by three metal hooks 124 (FIGS. 8, 9 and 10), the hooks being urged in a longitudinal direction by bent wire springs 126. One end of each spring 126 is bent and received in a hole in a plate 98, and the other end is also bent and received in a hole in a hook 124. As shown in FIG. 10, an end of each hook 124 is bent and received in a recess on the back of the mirror 104.

Figure 12:
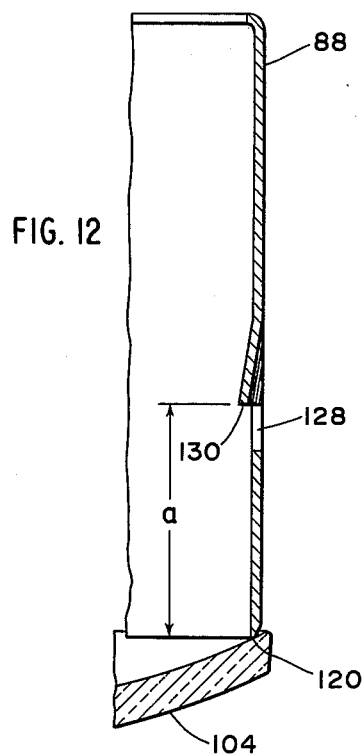
Figure 13:
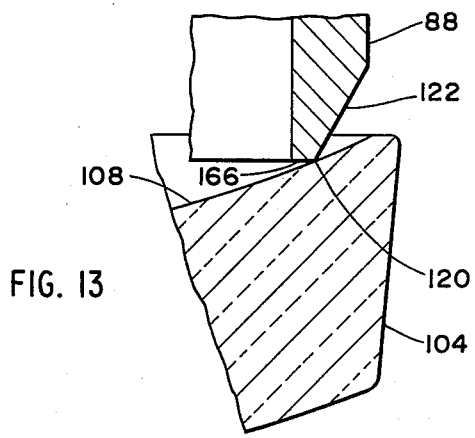
FIG. 13 is a fragmentary view in section showing the contact between the mounting barrel and the mirror.

Three perforations 128 (FIGS. 7, 8 and 12) are blanked out of the barrel 88. Each perforation has a straight side edge 130 furthest from the edge 120, the side edge 130 being bent inwardly of the barrel as shown in FIG. 12 and ground so that the edges 130 of all three of the perforations lie in a common plane precisely parallel to that of the edge 120. The plane defined by the edges 130 of the perforations is spaced a distance "a" from the plane defined by the edge 120, as shown in FIG. 12.

The barrel is drawn from a flat sheet into a closed ended cup shape with parallel cylindrical sides, in a suitable die. The end of the barrel is then punched out with blanking dies to form a spider comprising four legs 132 with a central hub portion 134. The hub 134 has a central circular hole defined by a tubular portion 136, and also has two opposed bracket portions 138. A target 140 comprises a single piece aluminum closed die forging having a cylindrical stem portion 142 projecting through the tubular portion 136, and an integral portion 144 of generally rectangular peripheral outline, having a phosphor coating upon its rearwardly facing spherical surface 146. The phosphor coating upon excitation produces a single color, being blue in the illustrated tube of FIG. 6. The portion 144 has a flat forward-facing surface 148 which is formed in a plane precisely perpendicular to the axis of the cylindrical surface of the stem portion 142 (the "target axis"). The surface 148 also is precisely located in molding with respect to the surface 146, whereby the surface 148 may serve as a reference plane for precise location of the target surface 146 as hereinafter more fully described. The portion 142 has a tapped hole 150 centered on the target axis, and also has a counter bore 152.

Figure 14:
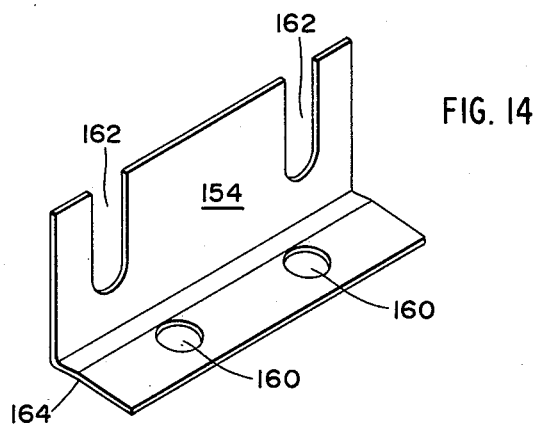
FIG. 14 is a view of one of the brackets for mounting the target upon the barrel.
Figure 22:
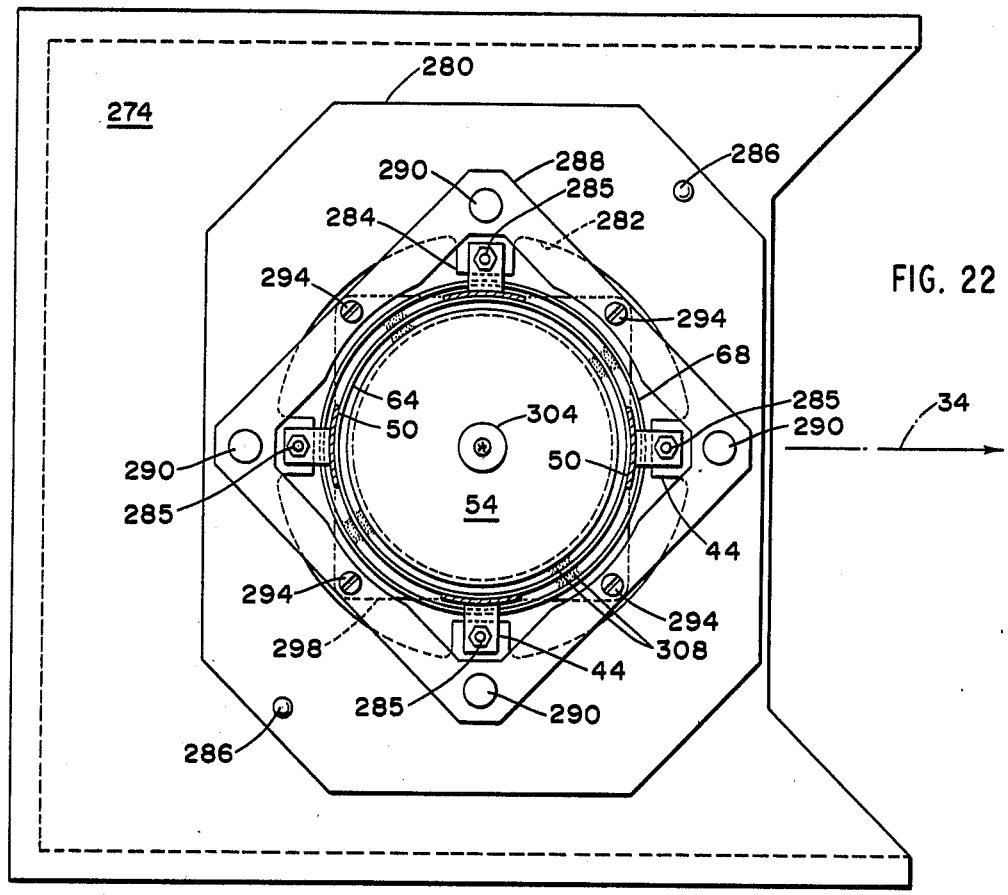
FIG. 22 is a plan view of the fixture shown in FIG. 20 and taken on line 22—22 thereof.
Figure 23:
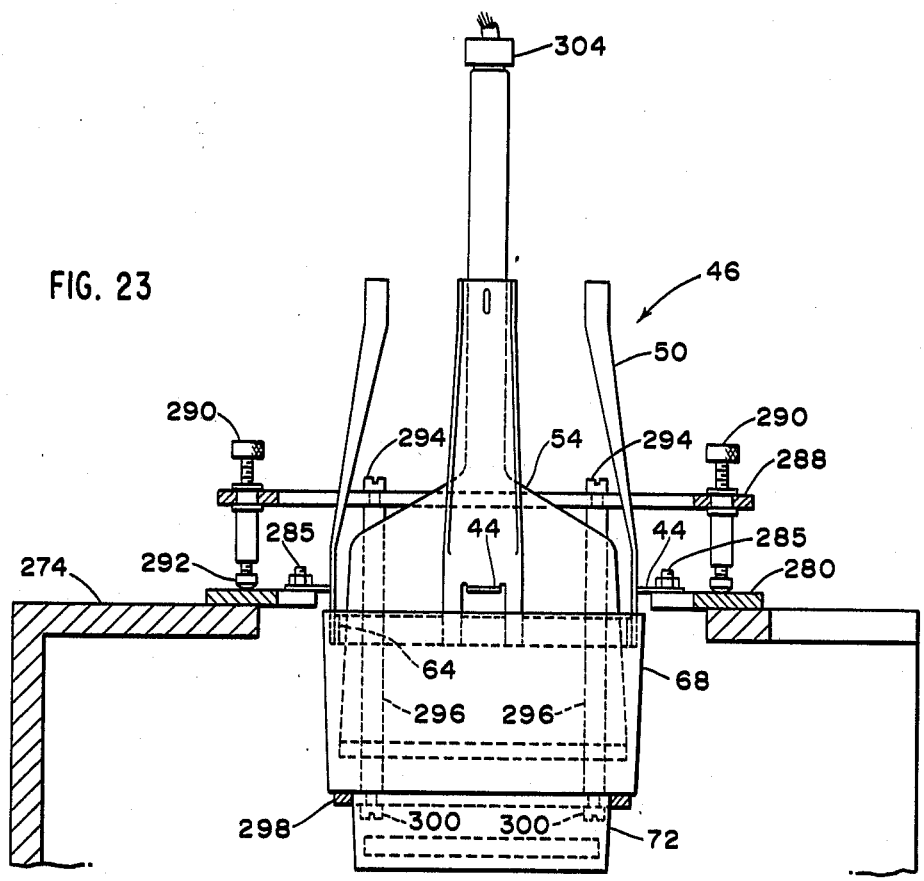
FIG. 23 is a fragmentary enlarged detail elevation of a portion of FIG. 20.

Two thin metal brackets 154 (FIGS. 6, 7 and 14) are each fastened by screws 156 to the surface 148, and by screws 158 to the portions 138. The screws 156 pass through circular holes 160 in the brackets 154, and the screws 158 are received in slots 162 in the brackets. As illustrated in FIG. 14, the brackets 154 are slightly bent at 164, so that upon tightening of the screws 156 the portions containing the slots 162 are urged radially inward.

This means of mounting the target allows for relative movement of the hub portion 134 and the target due to differential thermal expansion, without impairment of the accuracy of adjustments hereinafter described in relation to the first optical bench, temperatures within the envelope in use being of the order of 435°C. This results, more specifically, from the freedom of the metal brackets 154 to bend.

The steps of fabrication of the barrel include first forming the cup shape, then blanking out the end to form the spider, hub and perforations, and finally forming, in a single lathe setup with an accuracy preferably of the order of 1/1000 inch, the surfaces used for locating the positions of the mirror and target. In this setup, the inner surface of the tubular portion 136 of the hub 134 is accurately machined to cylindrical shape on an axis referred to herein as the "barrel axis." This axis, in the fully assembled tube, is defined as the "optical axis" 34. In practice, the axial extent of this surface may be very short, as it is not relied on to constrain the target rotatively about any axis transverse to the axis 34, as will be evident below. An end surface 166 of the barrel (FIG. 13) is ground to lie in a plane precisely perpendicular to the barrel axis. The conical chamfer 122 is ground with its axis coincident with the barrel axis, whereby the edge 120 formed by the intersection of the surfaces 166 and 122 is a substantially perfect circle. This ensures that the barrel axis will lie on a radius of curvature of the mirror surface 108, irrespective of any small lateral shifts in the position of the mirror with respect to the barrel. The edges 130 are also ground to locate them in a common plane parallel to the plane of the end surface 166 and at a predetermined distance $a$ therefrom.

As a consequence of the foregoing steps of fabrication of the barrel and of the target 140, the assembled position of the target surface 146 in relation to the mirror may be precisely adjusted and fixed. To this end the cylindrical surface of the stem portion 142 is precisely fitted within the formed cylindrical surface in the portion 136 of the hub 134. However, since the surface of the portion 136 may have a short axial dimension, its function is primarily to fixedly locate the target accurately with reference to translation in directions perpendicular to the barrel axis. As hereinafter described, the target is further adjustably located by means of the screws 158 which are tightened in their final positions after ($a$) adjustment of the position of the target 140 with reference to translation in the direction of the barrel axis, and ($b$) simultaneous adjustment with reference to rotation about any axis perpendicular thereto.

After the assembly of the barrel 88 and the components mounted thereon as described above, the barrel is mounted on the first optical bench shown in FIGS. 15 and 19. First, the barrel is placed in a fixture designated generally at 168. There is provided a flat base plate 170 having an enlarged central opening, into which three integral lugs 172 project. These lugs are angularly spaced in accordance with the angular spacing of the perforations 128 (FIG. 7) such spacing be uniform or not, as desired. Screws 174 pass through the lugs and are threaded into cylindrical core members 176 bearing on and depending from the underside of the plate 170. Cylindrical tubes 178 slidably fit over the cores 176, and have side cut-outs for receiving the lugs 172. Thus the tubes 178 are free to slide axially on the cores 176.

The cores 176 have recesses within which hooks 180 are pivotally attached to the cores on pins 182.

The plate 170 also receives three knurled screws 184, each located adjacent a lug 172 and having a tapered end 186. Initially, the screws 184 are retracted upwardly. The barrel 88 is then received over the tubes 178 with the tubes in the upper positions denoted by broken lines 186, wherein the hooks 180 are free to pivot inwardly due to the fact that the ends of the tubes are located above the lower portions of the hooks and out of interference contact therewith. Next, the tubes 178 are moved downwardly, thereby camming the projections 188 outwardly to the positions shown in FIG. 19 wherein they provide surfaces upon which rest the accurately ground edges 130 on the barrel. Then, the knurled screws 184 are tightened down until they bear upon the end of the frame 88 to ensure the contact between the reference edges 130 and the hooks 180.

A micrometer subassembly 190 is next mounted upon the plate 170. This subassembly has a double-ended beam 192, each end of which has an integral end portion 194. Each portion 194 has an appreciable dimension perpendicular to the plane of the drawing, the under surface of which rests upon two studs 196, the studs having portions of reduced diameter received in holes in the plate 170. Thus there are two spaced studs 196 at each end of the beam 192. The upper surfaces of the studs 196 are accurately ground so that they fall in a plane precisely parallel to the extended reference edges 130. Each of the end portions 194 has a bore 198 located between the pair of studs 196 and aligned with a threaded hole in the plate 170. The bores 198 received knurled screws 200 which may be threaded into the plate 170, but which are loose at this stage of the assembly.

A central portion 202 of the beam 192 is cylindrical and bored precisely perpendicular to the plane on the lower surfaces of the end portions 194 to receive a member comprised of a cylindrical neck portion 204 and a rectangular table portion 206 integral therewith. Four studs 208 are mounted on the table 206 and are accurately formed so that their lower ends as viewed in FIG. 19 fall in a plane precisely perpendicular to the axis of the hub 202. A screw 210 passes freely through the table 206, and is pinned or otherwise secured to a thumb wheel 212.

The upper portion of the neck 204 carries a screw or pin 214 which serves as a key sliding within a slot 216 in the hub 202. The neck 204 also carries thrust ball bearings 218 and a ball thrust bearing 220 which receive the spindle 222 of a micrometer 224. The nonrotating hub of the micrometer is fastened to the hub 202 by a set screw 226.

After initial mounting in the fixture of FIG. 19, the screws 158 holding the target are loosened. The screw 210 is threaded into the tapped hole 150 by rotation of the thumb wheel 212 until the front surface 148 of the target is brought firmly into contact with the ends of the studs 208. The knurled screws 200 are then threaded through the beam into the plate 170 to hold the beam firmly upon the plate. The assembly is then completed in position for adjustment of the target position as hereinafter described with reference to FIGS. 15 and 19.

A cross beam 228 on the optical bench supports a light source designated generally at 230 which is received through the aperture in the mirror 104, the light source being adapted to focus a sharp spot of light at a point 232 on the phosphor-coated surface of the target. The image of the luminous spot is reflected from the surface of the mirror 104 onto a mirror 234, from which it is reflected to a mirror 236, and from the mirror to a ground glass viewing screen 238. The light reflected from the mirror 104 passes through a Schmidt correction lens 240 which rests upon a ring 242, the latter resting upon a surface of the hub 202.

The micrometer 224 is adjusted so as to move the target up and down forming the sharpest possible image of the illuminated spot on the phosphor at the viewing plate 238. It will be appreciated that longitudinal adjustment of the target also necessitates an adjustment of the light source 230 so that the illuminated spot remains sharp on the phosphor surface at all times.

By the foregoing means the target is adjustably located in a precise position in the axial direction with respect to the barrel 88 and the mirror 104, as determined by the optical length of the bench shown in FIG. 15, this optical length being identical to that required for focusing on the screen 12 in FIG. 1. Thus the location of the target longitudinally within the barrel 88 is that position in which a sharply illuminated spot on the phosphor coated surface produces the best image on the viewing plate 238. Also, it is assured that when this adjustment is achieved, the target is fixedly located with reference to rotation about axes perpendicular to the barrel axis, by reason of the contact of the front surface 148 of the target with the studs 208, the studs establishing a plane parallel to the upper surface of studs 196 through the beam 192, which latter plane is precisely parallel to the plane defined by the edges 130 and 120 on the barrel. The screws 158 are then tightened.

After the adjustments in the location of the target 140 in relation to the frame and mirror as described above with reference to FIGS. 15 and 19, the barrel 88 and the parts assembled thereon are inserted into the envelope 54 and the mounting springs 92 are snapped over the plugs 86. The glass face plate 82 is sealed in a conventional manner to the end of the envelope 54, preferably using a glass frit in a conventional manner. A suitable electron gun 244 is also in place within the envelope (FIG. 5). The envelope is preferably coated on its inner surface with "Aquadag," an electrically conductive surface coating which is applied in a conventional manner prior to the insertion of the electronic and optical elements into the envelope. The back surface of the mirror 104 is also preferably coated with Aquadag. The envelope is then evacuated and sealed.

The next step in manufacture is the selection of a suitable Schmidt correction lens 74, and the permanent mounting thereof by means of the inner shroud 72 onto the face plate 82. This is accomplished on the second optical bench illustrated in FIG. 16.

The second optical bench is designated generally at 246, and comprises a frame 248 having mounted thereon a flanged potted assembly 250 containing deflection and focusing components for an electron beam. Mounted on the frame 248 is a table 252 upon which is located a slide 254. A ground glass target 256 is supported on the slide, and the location longitudinally of the slide is indicated by a scale 258 adjacent thereto. The optical bench also includes mirrors 260 and 262 used for the purpose of folding the optical path for convenience.

The procedure comprises first inserting an envelope 54 into the potted assembly 250, and attachment of a plug 264 extending by means of a cable to suitable circuits for projecting an electron beam. Preferably, these circuits are adapted to produce a Lissajous figure on the face of the target 140, with means for altering the figure at will by use of a suitable control to produce a point of light for a short time interval at the point 232 on the target where its surface is intersected by the axis 34.

For convenience, a number of correction lenses 74, each cemented in place within an inner shroud 72, are available. The plates have a plurality of curvatures having differing focal lengths, in addition to providing correction for optical distortions due to spherical aberration and coma in accordance with existing techniques in a Schmidt projector. Preferably, the back face of the lens 74 (the face nearer the plate 82) is formed to provide correction for spherical aberrations and coma, and the front face is either flat or curved depending upon the particular focal length of the lens. Typically, a correction lens having a flat front face is first selected and its shroud 72 is placed upon the face plate 82 of the envelope 54 over a shim 80.

Before turning on the electron beam, the location of the lens is then checked and adjusted as follows. As previously described, the lens 74 has a depression 114 having a flat surface 112. Cross lines 266 and a circle 268 are formed in relief on this surface, the lines 266 intersecting at the point 110. Ambient light illuminates the lines 266 and 268 which are directly visible by looking at the face of the plate. If the point 110 is located precisely at the center of the spherical surface 108, the mirror will focus an image of the lines 266 and 268 in perfect registry upon these lines. If the point 110 is not located at this center, the lines will form a separate image. The operator may make adjustments by adding more shims 80, and by sliding the inner shroud 72 over the surface of the face plate 82.

When registration of the image of the lines 266 and 268 has been achieved, the electron beam is turned on, and an image is formed on the face of the target 140. This image is projected by means of the mirrors 260 and 262 onto the face of the screen 256. The dimensions are such that the distance from a point 270 (FIG. 6), where the axis 34 intersects the front face of the plate 74, to the image of that point on the screen 256 is exactly 8 feet when the screen is opposite the 0 on the scale 258. If the screen 256 must be moved in either direction from this position in order to focus the image of that point, the screen will be opposite a + or − mark on the scale 258, these marks designating other available correction lenses having differing focal lengths. If another correction lens is thereby shown to be required, this lens is substituted for the one previously used, and the entire procedure described above is repeated, until focus is achieved with the screen 256 opposite the 0 on the scale 258.

Thus, upon completion of the foregoing adjustments, a correction lens has been selected and located on the face of the tube with the point 110 precisely at the center of curvature of the mirror 104, and the image of the point 232 projected through the system to focus at an optical distance of exactly eight feet from the point 270. The shroud 72 is permanently secured to the face plate 82 by means of a hot melt adhesive 272 applied at spaced intervals (FIG. 6).

The next step in manufacture is the location and mounting of the outer shroud 68 and the harness 46 upon the assembled envelope 54 and inner shroud 72. This is accomplished on the third optical bench illustrated in FIGS. 20 to 23. This bench comprises a suitable table 274 having a top aperture and an open side. A mirror 276 is mounted beneath the top aperture in position to reflect light to a screen 278.

A flat plate 280 is placed over the aperture in the table 274. The plate 280 has a generally circular aperture 282 with four inwardly projecting lugs 284. The lugs 284 have studs and nuts or other equivalent means located thereon in position to receive the lugs 44 of the harness, at the appropriate stage in the assembly. A pair of locating pins 286 project from the table 274 through holes in the plate 280 to locate it in the proper position.

There is also provided a flat plate comprising a generally square frame 288 having a generally square aperture therein, upon which are mounted four adjustment screws 290 with knurled heads and feet 292 which stand upon the plate 280.

Four screws 294 pass through the frame 288 and legs 296. A plate 298 of square shape with a circular opening is fastened to the ends of the legs 296 by screws 300. the aperture in the plate 298 is a close fit to the outer surface of the shroud 72.

With the plate 280 located in position on the pins 286 and the plate 288 in the position illustrated in the drawings, the outer shroud 68 may be lowered into position so that it rests upon the plate 298. The assembled envelope 54 and inner shroud 72 are then lowered into the outer shroud until they come to rest upon the inwardly projecting annular ring portion 70 of the outer shroud (FIG. 6). It will be observed by reference to FIGS. 6 and 23 that this establishes a fixed location in a vertical direction for the envelope and both shrouds. It also establishes a fixed location in a horizontal plane for the envelope and the inner shroud, with reference to the plate 288. The dimensions of the outer shroud 68 permit it to be moved in the horizontal plane in relation to the plates 288 and 298.

Next, the harness 46 is placed in position with its lugs 44 over the studs 285, securing the harness in a fixed position relative to the optical bench. (Toggle holddown clamps may be used in place of the studs 285, if desired.)

Thus the outer shroud and the assembled tube and inner shroud may each be independently moved relative to the fixed harness 46 in all directions transverse to the optical axis. The assembled tube and inner shroud are moved by shifting the position of the plate 288 over the plate 280, while the outer shroud 68 may be shifted slightly in the horizontal plane over the surface of the plate 298. In addition, the assembled envelope and both shrouds may be rotated about any horizontal axis by selective manipulation of the thumb screws 290. In addition, rotation of the assembled tube and inner shroud about a vertical axis may be accomplished by rotating the plate 288 slidably in relation to the plate 280.

FIG. 21 shows the face of the screen 278. The surface is of spherical contour, and has corner registration marks 302. A plug 304 is attached to the tube 54 and connected by a cable to a suitable electronic circuit for generating a raster illuminating the entire face 146 of the target. It will be understood that suitable deflection and beam focusing means are also assembled temporarily upon the tube for this purpose, although they have been eliminated from the drawing for purposes of clarity.

The adjustments made on this optical bench consist essentially in projecting an image 306 of the raster on the screen 278, and making the above-described adjustments by manipulation of the thumb screws 290 and by movement of the plate 288 over the plate 280 until the image 306 is precisely registered within the marks 302. When this registration has been obtained, spots 308 of a hot melt adhesive (FIG. 6) are injected into the spaces between the ring 64 and the envelope 54 and the outer shroud 68, respectively. After these three elements have been secured in fixed relationship thereby, the assembly is removed from the optical bench, after which the potting cement 66 is applied to impart additional rigidity to the structure.

Thus the optical bench of FIG. 20 is used for the purpose of establishing a precise relationship between the optical elements of the tube 18 and the lugs 44 of the harness to which it is attached. By inspection of FIGS. 1 to 4, it will be apparent that this relationship is that which will cause the tube to project a television image on the screen surface 36 in the proper location when the tube is mounted with its lugs 44 secured by the bolts 42 in the plate 40. The necessary relationship, for each of the tubes 14, 16 and 18, is fixed so that tubes of any particular color are interchangeable in the field without the necessity for position adjustment on the projector. On the other hand, it will be apparent that the relationship of each of the tubes 14, 16 and 18 to its related harness differs from that of the other tubes because each of the tubes bears a different spacial relationship to the screen, as is evident in FIGS. 1 and 2. Preferably, therefore, three different optical benches of the type shown in FIG. 20 are provided, one for each of the three color tubes.

Upon completion of the assembly operation on the third optical bench, and the subsequent addition of the potting compound 66, assembly of the tube is completed by assembly of the focusing magnet 58 and deflection yoke assembly 60 in a substantially conventional manner.

Except for the folding of the optical path on the "third" optical bench, this bench is set up, for each of the three color tubes, to position it in the same optical relationship to the screen 278 which the particular tube will bear to the screen 12 when assembled in the receiver-projector. A broken line 310 represents a horizontal line intersecting the center of the screen (the intersection of its diagonals) at a point 312 corresponding to the point 36 in FIG. 1. A line 314 represents the radius of the screen surface passing through the point 312. In FIG. 20 the bench for the "blue" tube is taken for purposes of illustration. A line 316 bears the same spacial relation to the axis 34 which the optical center line 28 of the tube cluster bears to that axis in the final assembly. The angular displacement of the lines 314 and 316 may be any desired value or may be zero, if desired. For a finite displacement of these lines a conventional keystone correction circuit is incorporated in the receiver-projector electronics, as stated above.

As a consequence of the structural relationships described above, the shape and precise location of the surface 146 of each target with respect to the optical axis of its tube (such as the axis 34) are predetermined. Thus the surface 146 is spherical and has a radius of curvature permitting the image to focus upon the spherical surface of the screen. The surface 146 is also tilted in that its center of curvature does not lie on the axis 34. This tilt is partially due to the angular displacement between the optical axis of the tube and the optical center line 28 of the tube cluster and partly due to the displacement of the center line 28 from the radius of the screen which it intersects at the center of the screen.

While the methods of optical alignment, focus and adjustment hereinabove described are capable of insuring accurate registration and line interlace of the images from the three color tubes, it is preferable to include viewer-operable horizontal and vertical fine alignment controls for each tube. These controls are of conventional form and are therefore omitted from this description.

We claim:

1. A projection television tube having, in combination,
   an envelope with means to seal it to define an evacuated space,
   a mounting barrel having supports engaging the envelope to secure the barrel fixedly against translation along and rotation about a barrel axis in said barrel and resiliently with respect to thermal expansion radially of said axis, said mounting barrel having a spider and a barrel portion with an accurately formed edge at one end thereof, said edge being circular with its center lying in said barrel axis,
   means in the envelope to project an electron beam through the barrel portion,
   phosphor coated target means in position for illumination by said beam and secured on the spider nonadjustably with respect to translation perpendicular to the barrel axis and adjustably with respect to translation along the barrel axis and rotation about any axis transverse thereto,
   and a projection mirror having an aperture for passage of said beam to the target means and a segmental spherical reflecting surface, said formed edge contacting said reflecting surface at a circle located inwardly of its periphery.

2. A projectiong television tube according to claim 1, in which said edge is formed by the intersection of an annular surface perpendicular to the barrel axis and a surface of revolution coaxial therewith.

3. A projection television tube according to claim 1, in which the barrel portion has a plurality of perforations in the wall thereof, each perforation having an accurately formed edge, said edges of said perforations lying in a common plane spaced from and parallel to the plane of said circular edge on said barrel portion.

4. A projection television tube having, in combination,
   an envelope with means to seal it to define an evacuated space,
   a mounting barrel secured within the envelope fixedly against translation along rotation about an axis in said barrel and resiliently with respect to thermal expansion radially of said axis, said mounting barrel having a barrel portion and a spider, the spider having a hub portion with an aperture therein,
   means in the envelope to project and electron beam through the barrel portion,
   target means comprising a target portion having a surface coated with a phosphor in position for illumination by said beam and a cylindrical stem portion slidable within the hub aperture adjustably with respect to translation along said axis and rotation about any axis transverse thereto,
   and a projection mirror mounted on the barrel portion and having an aperture for passage of said beam to the target portion and a segmental spherical reflecting surface in position to reflect light from the target portion.

5. A projection television tube according to claim 4, inlcuding a plurality of angle brackets, the legs of each bracket being respectively secured to and adapted for relative adjustment between the target portion and the hub portion.

6. A projection television tube according to claim 4, in which the target portion has a reference surface facing opposite the coated surface and accurately formed in a plane perpendicular to the axis of the stem portion.

7. A projection television tube having, in combination,
   an envelope with means to seal it to define an evacuated space,
   a mounting barrel secured within the envelope fixedly against translation along and rotation about a barrel axis in said barrel and resiliently with respect to thermal expansion radially of said axis, said mounting barrel comprising a spider having a hub portion with an aperture therein and a barrel portion with an accurately formed edge at one end thereof, said edge being circular with its center lying in said barrel axis, means in the envelope to project an electron beam through the barrel portion, target means comprising a target portion having a surface coated with a phosphor in position for illumination by said beam and a cylindrical stem portion adjustably slidable within the hub aperture, and a projection mirror mounted on the barrel portion and having an aperture for passage of said beam to the target portion and a segmental spherical reflecting surface lying in contact with said edge in position to reflect light from the target portion.

8. A projection television tube according to claim 7, in which the hub aperture is circular with its center lying in the barrel axis.

* * * * *

UNITED STATES PATENT OFFICE
CERTIFICATE OF CORRECTION

PATENT NO. : 3,969,648
DATED : July 13, 1976
INVENTOR(S) : George R. Hergenrother and Henry E. Kloss It is certified that error appears in the above-identified patent and that said Letters Patent are hereby corrected as shown below:

In claim 2, column 12, line 12, "projectiong" should read --projection--. In claim 4, column 12, line 27, after "along" insert --and--; line 33, "and" should read --an--.

Signed and Sealed this

Ninth Day of November 1976

[SEAL]

Attest:

RUTH C. MASON
Attesting Officer

C. MARSHALL DANN
Commissioner of Patents and Trademarks